United States Patent [19]
Leibinger et al.

[11] 3,721,154
[45] March 20, 1973

[54] TOOL CARRIER CONSTRUCTION

[75] Inventors: Berthold Leibinger, Gerlingen; Eugen Herb, Ditzingen; Hans Klingel, Korntal, all of Germany

[73] Assignee: Trumpf & Co., Stuttgart, Germany

[22] Filed: Aug. 18, 1971

[21] Appl. No.: 172,675

[30] Foreign Application Priority Data

April 9, 1970 Germany............P 20 43 855.5

[52] U.S. Cl. ....................83/698, 279/9, 287/104
[51] Int. Cl. ...............................................B26d 1/06
[58] Field of Search..............83/698; 287/103 R, 104; 279/9 R

[56] References Cited

UNITED STATES PATENTS

| 2,767,990 | 10/1956 | Jewell, Jr. | 83/698 X |
| 2,649,284 | 8/1953 | Letts | 287/104 UX |
| 2,107,581 | 2/1938 | Parsons et al. | 83/698 X |
| 1,843,136 | 2/1932 | Le Bos | 279/9 R |
| 1,462,556 | 7/1923 | Kropp | 83/698 X |

Primary Examiner—Andrew R. Juhasz
Assistant Examiner—W. Donald Bray
Attorney—John J. McGlew et al.

[57] ABSTRACT

A tool carrier which is adapted to be arranged on a ram or work spindle of a processing machine, particularly a machine tool, comprises a tool carrier formed as a laterally opened slot of the work spindle and including a slideable member which reciprocates in a bore overlying the outer end of the slot and closes the outer end to hold the tool in a position when it is lowered alongside the tool. The slot is advantageously provided with a projection in the form of an engagement ledge which fits under a recessed end of the tool in order to hold it in position.

10 Claims, 6 Drawing Figures

PATENTED MAR 20 1973 3,721,154
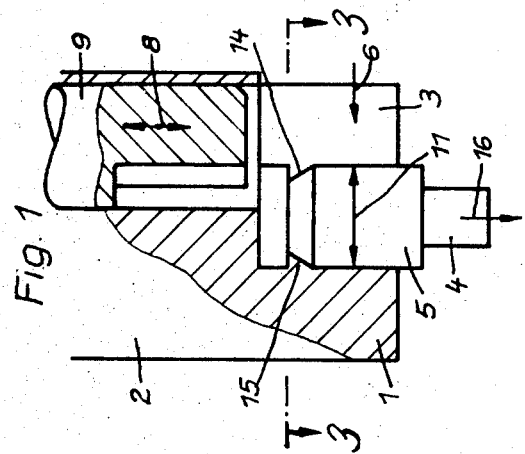
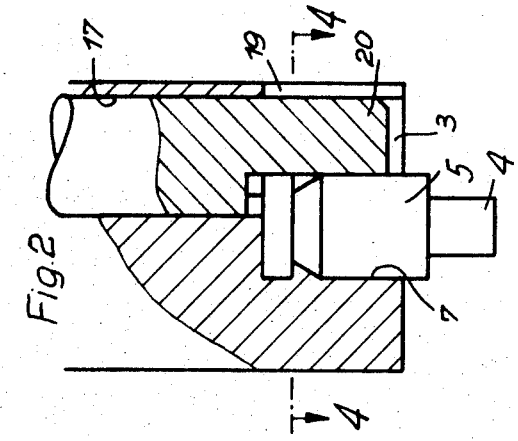
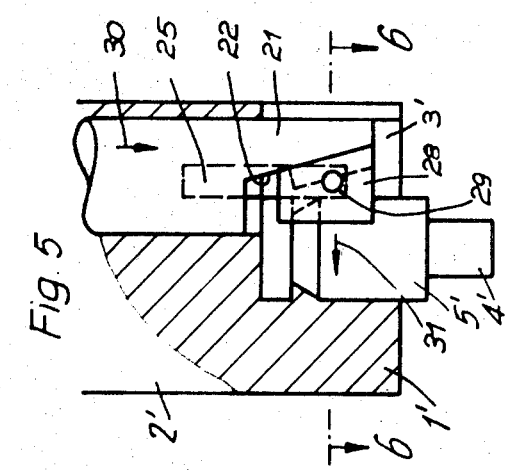
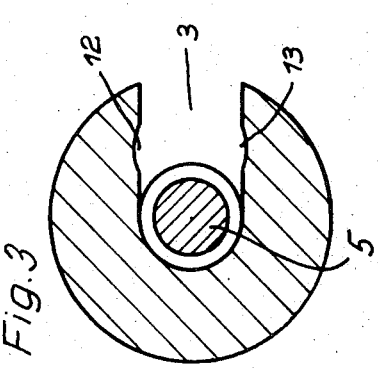
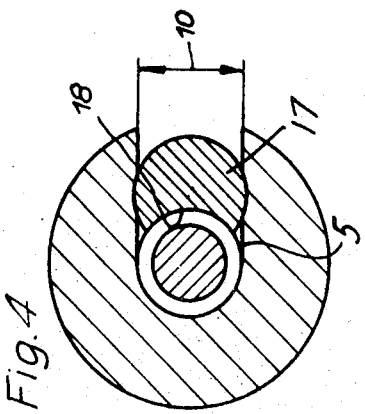
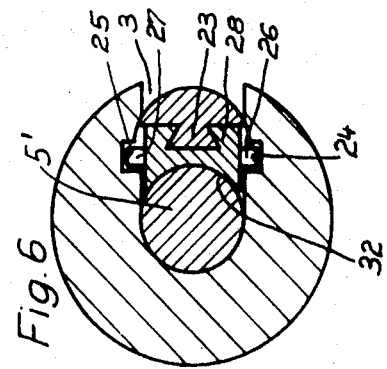
INVENTORS
BERTHOLD LEIBINGER
EUGEN HERB
BY HANS KLINGEL
John J. McBlew
ATTORNEY 3,721,154

TOOL CARRIER CONSTRUCTION

BACKGROUND OF THE INVENTION

1. Field of the Invention

This invention relates in general to the construction of tool carriers and in particular to a new and useful tool carrier which is formed on the end of a work member such as a work spindle by the construction of a laterally opening slot formed at the lower end thereof into which the tool handle is engaged and held in position by a movable holding member.

2. Description of the Prior Art

The invention relates particularly to a tool carrier arranged on a ram, a work spindle, etc., of a processing machine, particularly a machine tool, for a tool or tool part provided with a fastening shaft or pin. By a tool part, is meant, for example, the stamp of a tool consisting of a bottom die, stripper and stamp. But it can also be a female die cooperating with a male die. A tool includes the usual drills, cutters and other one-part tools. These tools are inserted into the known tool carriers in their longitudinal direction and are retained or locked by a suitable device. In order to be able to insert these tools, the bottom end of the tool carrier, pointing normally perpendicularly downward, must have a distance from the machining plane or work bench corresponding approximately to the length of the tool. In an automatic change of tools, the tool must perform in addition two perpendicular movements, first a horizontal advance movement toward the mouth of the tool carrier, and subsequently and inserting movement usually directed upward, for introducing the tool shaft into the bore of the tool carrier.

SUMMARY OF THE INVENTION

An object of the present invention is to provide a tool carrier where the end of the tool carrier facing the machining plane has a smaller spacing from this plane than the tool length. In other words, the spacing is independent of the length of the fastening pin, which requires in addition a movement of the tool in only one direction and thus simplifies substantially the automatic change of tools. For the solution of this problem in a tool carrier of the abovedescribed type it is suggested according to the invention that the tool carrier comprise a slot extending transverse to the longitudinal axis of the work member or spindle down to the bottom end of the spindle. The slot is laterally open at the edge and has a depth corresponding to the thickness of the tool or tool part. A slide valve moves in a spindle bore the longitudinal direction of the spindle for closing the slot end. The fastening shaft of the tool is retained between the inner slot end and the inner end of the slide valve pointing toward the latter. Before the tool is inserted, the slide valve is retracted so far that the lateral slot for the tool is completely exposed. After the tool has been inserted up to the inner end of the slot, the slide valve is moved in the direction of the free end of the tool which bears laterally on the circumference of the tool shaft not covered by the slot and retains it in the slot. When reference hereinafter is made only of tools and fastening shafts as well as of machine tools, these words also stand for the alternatives to be mentioned below.

The fastening shaft of the tool can be retained preferably by radial pressure. In a particularly advantageous embodiment of a tool carrier for a tool fastening shaft with an annular groove, an arcuate, e.g., a semicircular-holding bar, with a cross section corresponding to the cross section of the groove, which can be brought in engagement with the annular groove, is arranged at the inner slot end in a plane perpendicular to the shaft axis. Naturally several pins arranged in a suitable manner can perform the same function as the holding bar. This form-closed fastening device retains the tool in the longitudinal direction of the ram etc. and prevents the accidental removal thereof. If rotational forces act on the tool which tend to turn it in its carrier, it must be secured form-closed either by the above-mentioned radial pressure or, if this is not sufficient, by additional known means, like pins, adjusting springs, etc. It goes without saying that the arcuated holding bar must have a certain distance from the lowest point, seen in the axial direction of the ram, so that the innermost end of the tool projecting over the annular groove has sufficient room.

According to another feature of the invention, a bore or groove extending in a radical direction is provided in the above described manner on the fastening shaft, and on the tool carrier shaft is provided a holding pin, an adjusting spring, etc. which can be inserted therein and which secure the tool both against rotation and against removal in axial direction.

The diameter of the slide valve is greater, according to another feature of the invention, than the width of the tool carrier slot, and in addition the latter is locally widened, forming a guide groove for the slide valve in the two opposite slot walls. Due to the good fit which exists, the slide valve can be moved in its longitudinal direction, while lateral play exists only to the extend necessary for a good longitudinal displaceability.

The guide groove extends beyond the slot in the direction of the inner ram or spindle end, so that the slide valve can be pulled back for the change of tools in this direction. The two guide grooves can be combined there for the formation of a bore adapted to the shaft or tool diameter. For this reason the slide valve has preferably a circular cross section and its two guide grooves have a circular segment-shaped cross section.

The end of the slide valve pointing in the direction of the free end of the tool carrier is obliquely divided according to another feature of the invention, particularly under an acute angle to the longitudinal axis of the tool; and in addition, both parts are joined with each other for longitudinal displacement within a given range in the longitudinal direction of the dividing plane. A mutual longitudinal displacement along the dividing plane effects a radial spread and thus a radial pressure of the tool shaft against the inner slot end, which increases with increasing displacement. Naturally the operating comfort increases if this mutual displacement of the two parts of the bottom end of the slide valve can be produced automatically over the longitudinal movement of the slide valve. To this end at least one stop engaging a longitudinal groove of the divided part or cooperating with the outward pointing slide valve end is arranged on the tool carrier in a further development of the invention in order to limit the extension movement of the part mounted displaceably at the slide valve end. As soon as the piece, mounted obliquely for displacement at the free end of the slide valve and during the extension movement of the latter, strikes against this stop or the front end of the groove in the direction of extension, it can no longer take part in the further movement of the slide valve. A relative movement of the two inclined surfaces takes place during the further movement of the slide valve, which results in a positive inward movement of the piece directed toward the tool shaft. In order to ensure a uniform pressure on the shaft, this piece is shaped corresponding to the cross section of the shaft. In addition the groove width and the shaft thickness must be so adapted to each other that the transverse movement can take place to the necessary extent.

The slide valve piece is preferably joined with a slide valve end by means of a dovetail guide.

Another variation of the invention is characterized in that the slide valve is designed at its inner end as a piston and can be actuated hydraulically or pneumatically.

Accordingly it is an object of the invention to provide an improved tool holder which comprises a slot formation at the lower end of a movable tool holder which opens laterally at the lower end and which is closed by a holding member which is slidable in a bore of the work piece member.

A further object of the invention is to provide a movable spindle, ram or similar part having a slot at its lower end with a supported ledge in the slot for engaging into an annular recess of a shaft holder for a work piece and which also includes a reciprocatable valve member which closes the outer lateral side of the slot and embraces the shaft holder to position it firmly to the movable spindle or ram.

A further object of the invention is to provide a tool carrier which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated are preferred embodiments of the invention.

BRIEF DESCRIPTION OF THE DRAWINGS

In the drawing:

FIG. 1 is a partial sectional view of the bottom end of a tool carrier constructed in accordance with the invention;

FIG. 2 is a view similar to FIG. 1 but with the slide holder extended;

FIG. 3 is a section taken along the line 3—3 of FIG. 1;

FIG. 4 is a section taken along the line 4—4 of FIG. 2;

FIG. 5 is a view similar to FIG. 2 but of another embodiment of the invention; and FIG. 6 is a section taken along the line 6—6 of FIG. 5.

GENERAL DESCRIPTION OF THE PREFERRED EMBODIMENTS

Referring to the drawings in particular, the invention embodied therein in FIG. 1 to 4 comprises a ram or work spindle 2 of a stamping or nibbling machines having a bottom end 1 with a laterally opened slot 3 into which can be inserted a tool 4 which has a fastening shaft 5 affixed thereto. The fastening shaft 5 of the tool is inserted into the slot 3 laterally in a direction of the arrow 6. The inner wall or boundary 7 of the slot is adapted exactly to the cross sectional form of the shaft 5.

In the preferred form of the invention either the tool 4 or the shaft fitting 5 is machined with an annular neck portion or recess 14 of triangular cross section which provides an engagement notch which is centered over a projection or shoulder 15 formed on the inner wall 7 of the slot. After the tool shaft 5 is positioned as indicated in FIG. 1, a holder member or slide valve 9 is moved downwardly from the position indicated in FIG. 1 to close off the outer end of the slot and to embrace the shaft 5 of the tool 4.

The slot 3 is made substantially constant width as indicated by the dimension 10 in FIG. 4. It may, if desired, increase slightly toward the outside if necessary and, the width corresponds approximately to the diameter 11 of the tool shaft 5. The slot 3 is slightly widened at two diametrically opposite locations 12 and 13 to form a circular segment shaped cross section formed guide grooves for the slide valve 9. When the slide valve 9 is in a closed or downward position as shown in FIG. 2, the shaft is engaged over the projection shoulder 15 and the tool cannot be pulled out in the direction of the arrow 16.

The slide valve 9 has a circular cross section and it is mounted for reciprocation in a bore 17 which includes the two recessed portions 12 and 13 of the slot 3. The valve members 9 includes a fillet or recess 18 which is exactly adapted to the cross section of the tool shaft 5 as shown in FIG. 4.

In the retracted position of the slide member 9 as shown in FIG. 1, the slot 3 is completely opened laterally so that the tool 4 can be readily inserted or removed. In the bottom end position of the valve 9 which is almost reached in FIG. 2, the slot end 19 is closed by the shaped end 20 of the slide valve 9 so that no tool can be inserted nor can an inserted tool be removed. The shaft 5 of the inserted tool 4 is almost completely embraced by the inner slot end 7 and the recess 18 of the slide valve member 9 so that a transverse movement of the tool is not possible when it is gripped as indicated in FIG. 2. Longitudinal movement of the tool 4 with its shaft 5 is impossible due to the engagement of the projection shoulder 15 in the annular recess 14.

In the embodiment of the invention indicated in FIG. 5 and 6, a work spindle 2' includes a bottom 1' having a slot 3' of a configuration similar to the other embodiment. In this embodiment a holder member or slide holder 21 is made of two parts which are separated in a dividing plane 22 which is inclined in respect to the longitudinal axis of spindle 2' and of the tool 4'. In order to achieve a proper oblique guidance of the two parts relative to each other, the construction includes a dovetail joint 23. The ram 2' includes diametrically opposite oblong recesses 24 and 25 which open into each side of the slot 3'. A stop pin 26 and a stop pin 27 on the respective opposite sides of a bottom holder part 28 engage into the bottom end 29 of the recesses 24 and 25 respectively as the slide holder 21 moves downwardly. The downward movement of the part 28 is thus arrested by the engagement of the pins 26 and 27 in the associated side recesses. The slide holder 21 can continue to move in a direction of the arrow 30, however, due to the slidable joint which permits the displacement of the bottom engagement part 28 relative to the slide valve body 21. This relative displaceable movement is at an angle to the axis of the slide holder 21 so that the part 28 is displaced inwardly in a radial direction, that is, in the direction of the arrow 31. This causes an inner recessed portion 32 to be tightly pressed against the tool shaft 5' of a tool 4' so that the tool is clamped in position.

The slide holder 21 is thus effective automatically to engage and clamp the workpiece shaft 5'. When the slide holder 21 is lifted in a direction opposite to the arrow 30 the radial pressure diminishes in the direction of the arrow 31 and the piece 29 is moved upwardly and away from the shaft 5'. This tool carrier of the embodiment of FIGS. 5 and 6 is particularly suitable for the automatic change of tools.

The bottom end of the tool carrier 2' may have a distance from the work or the bottom die plane, for example, which is completely independent of the length of the fastening pin. For the hydraulic or pneumatic control of the movement of the slide valve 21 the upper end of the slide valve can be designed as a piston or be connected to a piston.

While specific embodiments of the invention have been shown and described in detail to illustrate the application of the principles of the invention, it will be understood that the invention may be embodied otherwise without departing from such principles.

What is claimed is:

1. A tool carrier adapted to be arranged on, or formed as part of, a tool holder member such as a ram, work spindle, etc., of a processing machine particularly a machine tool, comprising a tool holder member having a lower end with a slot opening laterally and downwardly and forming a tool engagement recess, said tool holder member having a bore above the lateral outer portion of the slot, and a tool holder slide moveable in the bore between a lower tool holding position, in which it closes the lateral opening of the slot around a tool positioned therein and holds the tool in position within the slot, and an upper position in which it is withdrawn from the slot and opens it laterally.

2. A tool carrier according to claim 1, including a fastening shaft for a tool engaged in the recess, said tool holder slide having a part exerting radial pressure on said fastening shaft.

3. A tool carrier according to claim 2, wherein said fastening shaft has an annular recess, the slot of said tool holder slide having an inner wall with a projection engaged in the annular recess of the fastening shaft.

4. A tool carrier according to claim 1, wherein said tool holder member includes a wall at the interior of the slot forming a projecting shoulder extending perpendicular to the axis of said holder, a fastening shaft for a tool having an annular recess extending inwardly to the axis of said shaft and perpendicular to the axis of said tool holder member and which is engaged by said projecting shoulder to hold shaft against withdrawal downwardly, said tool holder slide having a part bearing against said fastening shaft and acting in a radial direction.

5. A tool carrier according to claim 1, wherein said tool holder slide is of a diameter greater than the diameter of said slot, said slot being widened in the area underlying the bore for said tool holder member.

6. A tool carrier according to claim 5, wherein said tool holder slide has a circular cross section, said slot having a circular guide groove on each side thereof forming and extension of the bore of said tool holder.

7. A tool carrier according to claim 1, wherein said tool holder slide comprises a first part slidable in the bore and a second part carried at the lower end of said first part and being slidably connected thereto permitting relative movement of said second part in respect to said first part obliquely to the axis of said first part, said second part being engageable with the workpiece to apply radial inward pressure thereto.

8. A tool carrier according to claim 7, wherein said second part includes a laterally extending pin at each side, said slot having a groove extending vertically therealong on each side accommodating the respective pins, the size of the groove limiting the movement of said second part with said first part and permitting relative displacement of said second part relative to said first part when the pins move to the end of the associated grooves.

9. A tool carrier according to claim 7, wherein said first and second parts have a dovetail connection therebetween permitting relative sliding movement.

10. A tool carrier according to claim 1, wherein said tool molder member comprises a fluid pressure operable piston.

* * * * *

UNITED STATES PATENT AND TRADEMARK OFFICE
CERTIFICATE OF CORRECTION

PATENT NO. : 3,721,154

DATED : March 20, 1973

INVENTOR(S) : Berthold Leibinger et al.

It is certified that error appears in the above-identified patent and that said Letters Patent is hereby corrected as shown below:

On the title page, Item /30/ Foreign Application Priority Data

"April 9, 1970" should read -- Sept. 4, 1970 --.

Signed and Sealed this

Ninth Day of August 1983

[SEAL]

Attest:

GERALD J. MOSSINGHOFF

Attesting Officer     Commissioner of Patents and Trademarks